United States Patent Office 3,600,185

Patented Aug. 17, 1971

3,600,185

PHOTOGRAPHIC PRODUCTION OF ELECTRICALLY CONDUCTING METAL LAYERS

Hugh G. McGuckin, Rochester, N.Y., assignor to Eastman Kodak Company, Rochester, N.Y.

No Drawing. Filed Oct. 2, 1967, Ser. No. 671,972
Int. Cl. G03c 5/00
U.S. Cl. 96—36.2R 16 Claims

ABSTRACT OF THE DISCLOSURE

Highly reflecting, electrically conducting metal layers are produced employing photographic means, wherein a binder-free, chemically reduced layer of silver nuclei forms a receptive surface upon which the conducting metal layers are deposited by means of diffusion transfer, photoresist and plating techniques.

This invention relates to photography, and in particular, to both the photographic production of electrically conducting metal layers and the silver nucleated receiver elements used in producing such metal layers.

It is known in the photographic art to produce electrically conducting silver layers by photographic means. In certain processes, such as that described in U. S. Pat. 2,854,386, silver nuclei are produced by the photolytic reduction of a silver halide emulsion, which nuclei are then covered with an electrically conducting silver image by physical development techniques using a bath containing a silver salt and a reducing agent. The conductivity of elements of this type, however, is generally of a low order, and such processes are typically time consuming.

As described in King and Haist, U.S. Pat. 3,033,765, it is also known to photographically produce electrically conducting silver images utilizing a receiver sheet coated with a gold or tin salt nucleating agent. When this receiver sheet is contacted with a silver halide photographic element which has been processed in a monobath diffusion transfer developer solution, the nucleating agents are reduced to gold or tin metal nuclei and a silver metal layer is deposited upon these nuclei which are formed during processing. This process requires the use of particular silver complexing agents and must also form nuclei deposition sites during processing step.

As noted herein, known receiver sheets used in the photographic production of electrically conducting silver metal layers incorporate nucleating agents which must be reduced to metallic nuclei during processing. Often, the use of special silver complexing agents and reducing agents is required. Although it would be advantageous to incorporate preformed metallic nuclei on the receiver sheets, typical nucleated elements (wherein preformed nuclei are uniformly dispersed in a binder material prior to coating) are not advantageous for the formation of an electrically conducting metal layer since metal deposition sufficient to provide a practical degree of electrical conductance is not obtained.

Accordingly, it is an object of this invention to provide, for the photographic production of highly reflecting, electrically conducting metal layers, a novel receiver element incorporating preformed, chemically reduced metal nuclei.

It is another object of this invention to provide, for the photographic production of mirror-like, electrically conducting metal layers, a new receiver element incorporating a binderless layer of preformed, chemically reduced metal nuclei.

Still another obje of the present invention is to provide, for the photographic production of shiny, electrically conducting metal layers, a novel receiver element including a binderless layer of preformed chemically reduced metal nuclei upon which a conducting metal layer can be formed by plating means including electroless plating.

Yet an additional object of this invention is to provide new photographic processes for the production of highly reflecting, electrically conducting metal layers.

Still another object of the instant invention is to provide novel photographic processes for the photographic production of mirror-like, electrically conducting metal layers wherein the electrical conducting metal layer can be formed or supplemented by plating means.

Still additional objects will become apparent from a consideration of the following specification and appended claims.

These and other objects of the present invention are accomplished with a nucleated receiver element for recording photographically produced electrically conducting metal layers, which receiver element comprises a support having coated thereon, in an amount sufficient to promote the deposition of an electrically conducting metal layer, a binder-free layer of chemically reduced silver nuclei.

The subject nucleated receiver elements are prepared by coating a support material with a primarily aqueous dispersion comprising chemically reduced silver nuclei. The choice of a suitable support material is susceptible of wide variation. Generally, any typical photographic film base can be employed in the practice of the instant invention. Exemplary of such supports are, for example, cellulose acetate, cellulose nitrate, cellulose butyrate, polystyrene, poly(ethylene terephthalate) and paper including polyethylene and polypropylene-coated paper. Additionally, phenolic resins such as poly(phenol-formaldehyde) or poly(urea-formaldehyde) resins as well as other fiber reinforced resin sheets used in printed circuit manufacture are advantageous supports.

In particular instances, an otherwise advantageous support material can possess surface characteristics (such as smoothness) which do not promote a degree of adherence between the support and nuclei coated thereon sufficient to form a stable coating which is desirably resistant to abrasion, temperature, moisture and the like adverse conditions. When such a condition prevails, the support is advantageously treated with a subbing material prior to coating the subject nuclei. Such a treatment renders the support additionally adherent and receptive, so that a stable coating of the nuclei described herein can be obtained. Any of the many subbing materials which are well known in the photographic arts can be used. Typical of such subbing materials are gelatin, vinyl polymers such as polyvinyl alcohol and numerous polymeric materials, as well as other chemical compounds and compositions.

Silver nuclei of the subject invention are coated from an aqueous dispersion onto the described support materials. Such coating dispersions can be made in the desired concentration, but generally are dilutions of a stock nuclei dispersion. One example of a stock dispersion is prepared by first adding 40 parts by weight of 10% aqueous sodium hydroxide to 140 parts by weight of a 10% aqueous dextrin solution. To the sodium hydroxide-dextrin mixture is then added 100 parts by weight of 10% aqueous silver nitrate, whereupon the dextrin reduces the silver nitrate to metallic silver nuclei. These chemically reduced silver nuclei, when present in the composite nucleated receiver element, function as deposition sites for the chemically reduced metal which constitutes the subject electrically conducting layers. Additionally, spreading agents and other coating aids can also be present in the aqueous coating dispersion.

To prepare the subject nucleated elements, the coating dispersion is applied to a support material as described herein by a conventional coating means. Typically, hopper coating and doctor blade coating techniques are used, but any known method, such as dipping or spraying, is satisfactory. After the coating operation, silver nuclei are allowed to remain in contact with the support's surface for a short time period, after which excess nuclei are removed by suitable means such as washing with warm water followed by scraping with an air squeegee. The coated support is then dried, thereby producing the composite element.

The silver nuclei of this invention are preformed prior to coating and, as noted herein, are coated from an aqueous dispersion wherein the dextrin compound functions in part as a dispersing agent. During the removal of excess nuclei by such means as a warm water wash, the dextrin is also removed with the result that the silver nuclei in a completed element are not dispersed in a binder material which, if present, would surround the metallic silver nuclei and reduce their effectiveness as catalytic deposition sites in the formation of an electrically conducting metal layer. Known receiver elements have thus avoided the use of preformed nuclei which heretofore have been typically dispersed in a binder and then coated. Because of this problem, the nuclei in known elements have been formed during processing by the chemical reduction of nucleating agents such as water soluble metal salts, wherein the nuclei are produced on the surface of *any* existing binder.

Coating the nuclei-containing dispersion on a suitably subbed or unsubbed support material is usually accomplished at a silver coverage of from about 0.5 mg./ft.$^2$ to about 30 mg./ft.$^2$. At coverages substantially less than 0.5 mg./ft.$^2$, there are insufficient silver nuclei to promote the subsequent formation of a sufficiently electrically conducting metal layer. Where silver coverage considerably exceeds 30 mg./ft.$^2$, the removal of excess nuclei becomes difficult and contributes to a non-uniform nuclei distribution.

The subject nucleated elements, produced as described hereinabove, advantageously promote the formation of an electrically conducting metal layer over said nuclei, which metal layer can be formed by utilizing the methods of either diffusion transfer or photoresist techniques or a combination thereof. Plating, including electroplating and electroless plating, can be used in conjunction with diffusion transfer or photoresist means to provide an electrically conducting metal layer or to intensify the conductivity of existing photographically produced metal layers.

In one embodiment, high-reflectance, electrically conducting metal layers are produced by utilizing diffusion transfer techniques. An imagewise exposed photographic element bearing a silver halide emulsion layer (such as silver chloride, silver iodide or silver bromoiodide) is developed in a typical diffusion transfer alkaline developing composition. Such developer compositions are typically alkaline in character with a pH of at least about nine. They also incorporate a silver halide reducing agent or developer, such as a polyhydroxy benzene or a 3-pyrazolidone, and a silver halide solvent, such as an alkali metal or ammonium thiosulfate or one of other silver halide solvents known in the art.

The developed silver halide emulsion layer, while still wet with developer, is contacted with a nucleated element as described herein for a period of time sufficient to permit an adequate silver image formation on the silver nuclei development sites. Typical contact periods range from about 20 seconds to about 4 minutes, depending on the type of emulsion and developer solution, but shorter and longer times can be used. The image formed on the nucleated element is a high-density, extremely shiny silver metal layer which exhibits a high degree of electrical conductance. A short treatment in a fixing bath containing a silver halide solvent, such as one having the formula:

Water—600.0 cc.
Sodium thiosulfate—360.0 g.
Ammonium chloride—50.0 g.
Sodium sulfite (desiccated)—15.0 g.
Acetic acid (28% aqueous)—48.0 cc.
Boric acid, crystals—7.5 g.
Potassium alum—15.0 g.
Water to make 1 liter can improve the durability of the silver image.

Conductivity values as expressed herein are given in terms of electrical resistance ohm units, which is the reciprocal of electrical conductance. Readings are taken with an electrical resistance meter (ohmmeter) and measure the resistance between two pointed electrodes held in contact with the conducting layer and at a separation of one inch.

An electrically conducting silver metal layer as described hereinabove can be rendered additionally conductive by forming a second metal layer over the first silver metal layer by using well-known electroplating or electroless plating techniques. Typical such second layers are of copper metal, although other metals such as nickel, silver, cobalt and the like can be used, and the final product is a composite metal layer which is more highly conductive than the diffusion transfer deposited silver layer alone. Conventional electroplating, however, necessitates making an electrical connection on each element to be plated, whereas electroless plating avoids such an inconvenience since it merely utilizes the chemical reduction of a metal ion to form the plated metal. Typical electroless plating baths generally include, in common solution, a metal ion, a complexing ion for the metal ion and a reducing agent for the metal ion. Buffering agents and other addenda which assist the desired reduction of a metal ion can also be present.

The rate of plating a second metal layer can be accelerated by bathing the nucleated element bearing its first layer of silver in a weak (e.g., 1%) potassium chloropalladite solution prior to the plating operation. With such treatment, a highly conducting copper or other metal layer is plated over the silver layer by electroless plating means (e.g., 4 minutes at about 25° C.). Additionally, the plated layer is shinier and better adhering when the element is previously treated with potassium chloropalladite solution. Unwanted background plating can be eliminated by a short pretreatment in a weak (e.g., 1 to 5%) solution of Farmers Reducer. By such a technique, an imagewise electrically conducting metal layer can be provided in a short time and without special chemical complexing agents. The conducting images are of high resolution and optical density, as well as highly reflecting, thus simplifying image recognition and evaluation.

In another embodiment, the above-described nucleated element is coated with a photosensitive polymeric resist to provide a composite light-sensitive element which can be used to form electrically conducting metal layers by means of diffusion transfer or plating techniques or combinations thereof.

The resist coating can be any of the positive or negative-working resist known in the art. Typical negative-working resists containing, for example, such light-sensitive units as cinnamic acid esters like cinnamylmalonate, are described in U.S. Pats. 2,732,301; 2,852,379; 3,250,-615; and in U.S. Ser. No. 602,581, now abandoned, filed Dec. 19, 1966 and presently copending herewith. Positive-working resist which are advantageously employed herein include those containing polymers such as amidic polymers and hydroxylated or sulfonated compounds wherein the exposed areas undergo a solubility shift, and as such, are susceptible of selective removal. These noted resists are solvent developable, and after an imagewise exposure and processing by, for example, immersion in or swabbing with a developer solvent, an exposed or unexposed imagewise distribution of resist remains on the element, uncovering a converse imagewise pattern of silver nuclei where resist has been removed by the developer solvent. The silver nuclei which are present on the support do not exhibit deleterious solubilizing or other interaction with typical photoresist developer solvents such as alkaline solutions like sodium hydroxide, organic alcohols like ethanol or other typical organic solvents, cyclohexanone for example.

Once an imagewise or other uncovering of silver nuclei is obtained, a conducting metal layer can be formed on the accessible, non-resist-coated nuclei by diffusion transfer or plating techniques as described above. For example, an unexposed silver halide element can be immersed in a typical diffusion transfer developer and then its silver halide emulsion layer contacted with the resist-coated, nucleated receiver element to provide an electrically conducting silver metal layer over the uncovered nuclei. The conductivity of such a metal layer can be advantageously intensified by the subsequent plating of a second metal layer, such as copper or other metals noted herein, using conventional electroplating or electroless plating techniques. The details of such a plating operation are described above and apply here, except that bathing in Farmers Reducer is not required to curb background plating, since those areas are protected by unremoved resist. After the desired electrically conducting metal layer is produced, any unwanted resist can be removed by suitable solvent treatment.

Alternatively, once a resist pattern is removed and a corresponding pattern of nuclei are uncovered, an electrically conducting metal layer such as copper, silver, nickel or cobalt can be deposited on the nuclei by plating alone, without the need for a first silver image produced by diffusion transfer techniques. After a brief immersion in weak aqueous potassium chloropalladite which operates in part to promote a more highly reflecting and adherent layer, the element carrying uncovered silver nuclei can be plated directly by either electroplating or electroless plating techniques. The prior treatment in potassium chloropalladite, although preferable, can be eliminated if plating time is extended. Any remaining resist image can be removed by suitable solvent treatment, thereby providing a support carrying a highly reflecting electrically conducting metal layer which is advantageous for such uses as, for example, printed circuits, mirrors, magnetic data recording and other uses wherein the combination of electrical conductivity and high reflection would prove useful. Where an overall metal layer is desirable, electroless or other plating can be accomplished directly on the nucleated element without intervening treatment.

The invention has been described above in considerable detail, but following are examples of particular embodiments thereof which serve to further point out the present invention. They are merely illustrative and should not be regarded as expressions of limitation.

EXAMPLE I

A stock dispersion comprising (a) 140 ml. of 10% aqueous dextrin, (b) 40 ml. of 10% aqueous sodium hydroxide which is added to the dextrin, and (c) 100 ml. of 10% aqueous silver nitrate at 40° C. which is added to the mixture of (a) and (b) with stirring, produces silver nuclei due to the dextrin induced reduction of silver nitrate to metallic silver. Twelve and one-half ml. of this stock silver nuclei dispersion are added to 87.5 ml. of distilled water which produces a coating dispersion. A trace amount of saponin spreading agent is also added to the coating dispersion. The coating dispersion is then applied to a subbed cellulose acetate support material by hopper coating means and at a rate sufficient to provide an overall coverage of 1 g./ft.$^2$. About one minute subsequent to coating, the nuclei coated support is passed through a bath of circulating water held at a temperature of 90° F. to remove nuclei which are not yet firmly adhered to the surface of the subbed support. After immersion in the described water bath, the nuclei coated support is air squeegeed and dried, thereby producing a composite nucleated receiver element. An extremely shiny, high-density conducting silver layer is then formed on the surface of the nucleated element by contacting it for a period of 2 minutes at about 25° C. with an imagewise exposed photographic element having coated thereon a low-speed, high contrast gelatino silver chlorobromide emulsion, which element has been previously treated for 8 seconds at about 25° C. in a diffusion transfer developer having the formula:

| | G. |
|---|---|
| Methylaminoethanol-$SO_2$ addition product (19 wt. percent $SO_2$) | 100.0 |
| Hydroquinone | 20.0 |
| 1-phenyl-4,4-dimethyl-3-pyrazolidone | 3.0 |
| Sodium thiosulfate·$5H_2O$ | 100.0 |

Water to make 1 liter.
Sodium hydroxide to pH=11.2.

Upon separation of the two elements, a highly reflecting, electrically conducting silver metal layer is present on the nucleated element in an imagewise distribution corresponding to the unexposed areas of the silver halide element. To improve the durability and abrasion resistance of the electrically conducting silver layer on the receiver element, it is immersed for about three seconds in a rapid acid fixing bath having the formula:

Water—600.0 cc.
Sodium thiosulfate—360.0 g.
Ammonium chloride—50.0 g.
Sodium sulfite (desiccated) 15.0 g.
Acetic acid (28% aqueous)—48.0 cc.
Boric acid (crystals)—7.5 g.
Potassium alum—15.0 g.
Water to make 1000 cc.

Conductivity values are then taken for the silver layer, such values being read and expressed as electrical resistance (in ohms), which is the reciprocal of electrical conductance. The receiver element bearing the metallic silver layer is cut into strips having a width of one-half inch and a length of at least two inches, and two pointed electrodes connected to an electrical resistance measuring ohmmeter are contacted with the conducting silver metal layer at a separation of one inch. The resistance value is about four ohms. Five additional electrical conducting silver layers are produced according to the method described in this example, except that the silver halide element is contacted with the nucleated receiver element for varying time periods before stripping apart. Resistance measurements are taken on like portions from these five additional elements and the respective conductivity of each of the six samples is summarized in tabular form as follows:

| Contact time: | Resistance in ohms |
|---|---|
| 7 sec. | 6,000.0 |
| 22 sec. | 11.5 |
| 52 sec. | 7.0 |
| 1 min. 52 sec. | 4.0 |
| 2 min. 0 sec. | 4.0 |
| 2 min. 52 sec. | 3.5 |

By the above method and varying with time allowed for silver deposition, a mirror-like, electrically conducting silver metal image is formed on the subject nucleated element by photographic means. The resistance of said metal layer is subject as well to the composition of processing solutions for the silver halide photographic element, thereby permitting even shorter contact times where the silver halide diffuses to the nucleated element at a more rapid rate.

EXAMPLE II

A highly reflecting, electrically conducting silver metal layer is prepared according to the method described in Example I, with the following exceptions. The coating dispersion contains only 3.12 ml. of stock dispersion and coating is at a coverage of 4 g./ft.$^2$. Additionally, the silver halide photographic element is immersed for 10 seconds in a developer solution as in Example I, but with only 50 g./liter of sodium thiosulfate. The conducting silver layer formed is similar to that of Example I. No after treatment is given to this layer.

EXAMPLE III

A fiber-filled phenolic resin sheet, marketed under the name Synthane by the Synthane Corporation, whose surface is first roughened by sanding with a fine abrasive cloth (0/0 emery paper), is soaked for two minutes, with agitation, in an undiluted stock dispersion as described in Example I. The sheet is then washed to remove non-adhering nuclei. A shiny, electrically conducting silver image is formed on this nucleated support by contacting it for 5 minutes at about 25° C. with photographic element having coated thereon a low speed, high-contrast gelatino silver bromoiodide emulsion which has been pre-soaked for about 5 minutes in a diffusion transfer developer having the formula:

| | G. |
|---|---|
| Iminodiethanol-$SO_2$ addition product (13 wt. percent $SO_2$) | 200.0 |
| Hydroquinone | 25.0 |
| 1-phenyl-4,4-dimethyl-3-pyrazolidone | 1.0 |
| Sodium thiosulfate·$5H_2O$ | 75.0 |
| Water to make 1.0 liter. | |
| Sodium hydroxide to pH=10.0. | |

The metal layer so formed is similar to that of Example I.

EXAMPLE IV

An electrically conducting silver metal layer is formed as in Example I except that the photographic element is pretreated for 10 seconds in the diffusion transfer developing composition, and the contact time between the nucleated receiver element and photographic element is shortened to produce a resistance in excess of $10^9$ ohms, the upper limit of the measuring ohmmeter. The silver layer produced thereby is then treated in the following manner:

(a) Immersed for 15 seconds in a dilute Farmers Reducer solution having the formula:

| | G. |
|---|---|
| Part A: | |
| Potassium ferricyanide | 7.5 |
| Water to make 1.0 liter. | |
| Part B: | |
| Sodium thiosulfate | 200.0 |
| Water to make 1.0 liter. | |

wherein the concentration is 5 ml. of Part A and 5 ml. of Part B per 100 ml. water, (b) Rinsed for 15 seconds in distilled water,
(c) Bathed for 15 seconds without agitation in a 0.1% aqueous potassium chloropalladite solution, and
(d) Rinsed for 30 additional seconds in distilled water.

The support carrying the pretreated silver metal layer is then immersed for four minutes with gentle agitation in an electroless copper plating bath having the formula:

Sodium hydroxide—20.0 g.
Cuprous nitrate—15.0 g.
Sodium bicarbonate—10.0 g.
Sodium potassium tartarate (Rochelle salt)—30.0 g.
Formaldehyde (37% aqueous)—100.0 ml.
Water to make 1.0 liter.
Adjust pH to 11.5.

After plating, the element is rinsed thoroughly in water and dried. The above treatment produces a mirror-like, fine-grain, metallic copper layer over the prior-deposited conducting silver metal layer. As noted above, the resistance of the silver is in excess of $10^9$ ohms, the measuring capability of the ohmmeter. The electroless copper plating treatment produces a lowering in resistance which is summarized in the following table.

| Plating time in bath (minutes) | Resistance (ohms) | Optical density |
|---|---|---|
| 0 | (1) | .26. |
| 1 | (1) | .46. |
| 2 | 12.0 | 1.04. |
| 4 | 1.8 | 2.10. |
| 8 | 0.4 | 3.76. |
| 16 | 0.0 | Over 4.0. |

[1] Too high to measure.

EXAMPLE V

A composite silver-copper layer is prepared as in Example IV, except that the nucleated receiver element is that of Example II. The highly reflecting surface and electrical resistance (1/conductance) properties are identical to those of the metal layer of Example IV.

EXAMPLE VI

An electrically conducting silver metal layer is prepared as described in Example III and treated according to the procedure outlined in Example IV, except that the treatment in Farmers Reducer solution is for 30 seconds at a concentration of 10 ml. of each of Parts A and B per 100 ml. of distilled water. After such treatment, it is immersed for eight minutes in the electroless copper plating bath described in Example IV. A shiny, composite silver-copper metal layer of like electrical resistance is the result.

EXAMPLE VII

A nucleated receiver element as described in Example I is coated with a .0003 inch coating of a photosensitive resist having the formula:

Poly(epichlorohydrin/diphenylolpropane), marketed under the name "Epikote 1007" by Shell Oil Company—10.0 g.
Methyl ethyl ketone—100.0 ml.
4,4′-diazidostilbene—3.0 g.
Trichloroethylene—30.0 g.

The resulting receiver element is imagewise exposed for 3 minutes to the rays of two 400 watt, high pressure mercury vapor lamps held approximately 18 inches from the exposing plane and then treated with a 3:2 mixture of xylene and methyl Cellosolve acetone to remove resist in the unexposed areas. The resist coated silver nucleated receiver element is then pretreated by immersion in a 0.1% aqueous potassium chloropalladite solution for 15 seconds at about 25° C. and rinsing for 30 seconds in distilled water, after which it is bathed for 4 minutes in the electroless plating solution as described in Example IV. The bright, highly reflecting and electrically conducting copper image produced upon the silver nuclei of the receiver element also exhibits a high degree of adherence.

EXAMPLE VIII

A highly reflecting electrically conducting copper layer is formed according to the procedure of Example VII, except that the nucleated receiver sheet is prepared with poly(ethylene terephthalate) support material. Additionally, the resist coating has the formula:

Poly(tetramethylene cinnamalmalonate)—10.0 g.
Methyl Cellosolve acetate—80.0 cc.
Cyclohexanone—20.0 cc.
4 - (4 - amyloxyphenyl) - 2,6-bis(4-methoxyphenyl)thiapyrylium perchlorate—0.2 g.

The final copper image resembles that of Example VII.

EXAMPLE IX

A highly reflecting, electrically conducting copper layer is produced according to the procedure of Example VII, except that the nucleated receiver sheet is prepared with a fiber-filled phenolic support material as described in Example III. Additionally, the resist coating has the formula:

Polyvinyl cinnamate—2.5 g.
2-benzoylmethylene-1-methyl-β-naphthothiazoline—.25 g.
Chlorobenzene—33 cc.
Toluene—66 cc.

The final copper image resembles that of Example VII.

EXAMPLE X

A nucleated element carrying a resist image is prepared accordingly to the method of Example VII. It is then bathed in an aqueous 0.1% potassium chloropalladite solution for about 10 seconds at 25° C., after which it is briefly rinsed in water and placed for 15 seconds in a 95° F. electroless cobalt plating bath having the formula:

Sodium hydroxide—20.0 g.
Cobaltous nitrate—15.0 g.
Sodium bicarbonate—10.0 g.
Sodium potassium tartarate (Rochelle salt)—30.0 g.
Formaldehyde (37% aqueous)—100.0 ml.
Water to make 1 liter
Adjust pH to 11.5

This solution is stirred during the plating operation and a resulting mirror-like, optically dense and well adhering cobalt metal layer is present over the non-resist bearing silver nuclei. Electrical resistance is low. Like elements are prepared except that longer plating times are employed. Thicker more highly conductive cobalt layers are obtained without deleteriously affecting adhesion of the plated cobalt metal layer.

EXAMPLE XI

A conducting metal layer is prepared according to the procedure of Example VII, except that the electroless copper plating bath is replaced with a physical developer solution having the formula:

Part A:
Distilled water—750.00 ml.
2 - amino - 5 - diethylaminotoluene monohydrochloride—3.80 g.
Sodium sulfite—62.00 g.
Hyamine 10X [1]—0.14 g.
Distilled water to make 900.00 ml.

[1] (Di-isobutyl cresoxy ethoxy ethyl dimethyl benzyl ammonium chloride) Rohm and Haas Co.

Part B:

5 percent aqueous silver nitrate for use:
1 Part B: 9 Parts A

A highly reflecting, electrically conducting silver metal layer is produced, although abrasion resistance is inferior to that of the copper metal layers.

EXAMPLE XII

A silver metal layer is prepared according to the procedure of Example XI, except that the nucleated receiver element is on poly(ethylene terephthalate) support material. The electrically conducting silver layer obtained thereby is similar to that of Example X.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A nucleated receiver element for recording electrically conducting metal layers, said receiver element comprising a support having coated thereon, in an amount sufficient to promote the deposition of an electrically conducting metal layer, a binder-free layer consisting essentially of preformed chemically reduced silver nuclei at a silver coverage of from about .5 mg./ft.$^2$ to about 30 mg./ft.$^2$.

2. A nucleated receiver element as described in claim 1 wherein the support is selected from the group consisting of cellulose acetate, poly(ethylene terephthalate) and a phenolic resin.

3. A nucleated receiver element as described in claim 1 wherein the support is subbed to promote adherence of the silver nuclei.

4. A nucleated receiver element as described in claim 1 wherein the first layer of silver nuclei is overcoated with an additional second layer comprising a photosensitive polymeric resist.

5. A nucleated receiver element as described in claim 4 wherein the support is selected from the group consisting of cellulose acetate, poly(ethylene terephthalate) and a phenolic resin.

6. A photographic process for the production of an electrically conducting metal layer, said process comprising:

(a) immersing an imagewise exposed silver halide-containing photographic element in a photographic black-and-white alkaline developing composition for a period of time sufficient to produce a silver image in the areas of exposure, and (b) contacting said developed silver halide element with a nucleated receiver element comprising a support having coated thereon, in an amount sufficient to promote the deposition of an electrically conducting metal layer, a binder-free layer consisting essentially of preformed chemically reduced silver nuclei at a silver coverage of from about .5 mg./ft.$^2$ to about 30 mg./ft.$^2$, for a period of time sufficient to produce a conducting silver metal layer on said nuclei in an imagewise pattern corresponding to the unexposed areas of said silver halide-containing photographic element.

7. A photographic process as described in claim 6 wherein the electrically conducting silver layer is rendered additionally conductive by immersing the receiver element in a plating bath containing metal ions for a period of time sufficient to product an additional electrically conducting layer upon the said conducting silver layer.

8. A photographic process as described in claim 7 wherein the metal ion is selected from the group consisting of copper, silver and cobalt ions.

9. A photographic process as described in claim 7 wherein the plating is accomplished by immersion of the receiver element in an electroless plating bath comprising a solution of a metal ion, a complexing ion for said metal ion and a reducing agent for said metal ion.

10. A photographic process for the production of an electrically conducting metal layer, said process comprising:

(a) treating an imagewise exposed element which comprises a support having coated thereon a first layer consisting essentially of preformed chemically reduced silver nuclei at a silver coverage of from about .5 mg./ft.$^2$ to about 30 mg./ft.$^2$ and a second layer comprising a photosensitive polymeric resist, with a developer solvent for said resist, which treatment removed an imagewise pattern of said silver nuclei leaving uncovered silver nuclei areas, and (b) immersing the developed element in a plating bath containing metal ions for a period of time sufficient to produce an electrically conducting metal layer over said uncovered silver nuclei areas.

11. A photographic process as described in claim 10 wherein the metal ions are selected from the group consisting of copper, silver and cobalt ions.

12. A photographic process as described in claim 10 wherein the plating is accomplished by immersion in an electroless plating bath comprising the common solution of a metal ion, a complexing ion for said metal ion and a reducing agent for said metal ion.

13. A photographic process for the production of an electrically conducting metal layer, said process comprising:

(a) treating an imagewise exposed element comprising a support having coated thereon a first layer consisting essentially of preformed chemically reduced silver nuclei at a silver coverage of from about .5 mg./ft.$^2$ to about 30 mg./ft.$^2$ and a second layer comprising a photosensitive polymeric resist, with a developer solvent for said resist, which treatment removes an imagewise resist pattern and thereby uncovers a like imagewise pattern of said silver nuclei, and (b) contacting the developed element with an unexposed silver-halide-containing photographic element which has previously been treated with a photographic diffusion transfer developer composition, for a period of time sufficient to produce an electrically conducting silver layer over the said uncovered silver nuclei areas.

14. A photographic process as described in claim 13 wherein the conducting silver layer is rendered additionally conductive by immersing the element in a plating bath containing metal ions for a period of time sufficient to produce an additional electrically conducting metal layer upon the conducting silver metal layer.

15. A photographic process as described in claim 14 wherein the metal ions are selected from the group consisting of copper, silver and cobalt ions.

16. A photographic process as described in claim 13 wherein the plating is accomplished by immersion in an electroless plating bath comprising the common solution of a metal ion, a complexing ion for said metal ion and a reducing agent for said metal ion.

References Cited

UNITED STATES PATENTS

| | | | |
|---|---|---|---|
| 3,032,443 | 5/1962 | Short | 117—160 |
| 3,033,765 | 5/1962 | King | 96—36.2 |
| 3,075,866 | 1/1963 | Baker | 96—36.2 |
| 3,219,445 | 11/1965 | Lu Valle | 96—94 |
| 3,222,218 | 12/1965 | Beltzer | 117—160 |
| 3,457,138 | 7/1969 | Miller | 117—160 |

FOREIGN PATENTS

| | | | |
|---|---|---|---|
| 968,454 | 9/1964 | Great Britain | 96—94 |

NORMAN G. TORCHIN, Primary Examiner

J. R. HIGHTOWER, Assistant Examiner

U.S. Cl. X.R.

96—94BF